United States Patent
Gu et al.

(10) Patent No.: US 9,011,671 B2
(45) Date of Patent: Apr. 21, 2015

(54) COAL PROCESSING METHOD BY USING CHARACTERISTICS OF SUB-CRITICAL AND SUPERCRITICAL WATER

(75) Inventors: Junjie Gu, Hebei (CN); Jinlai Li, Hebei (CN); Zhongxue Gan, Hebei (CN)

(73) Assignee: Enn Science & Technology Development Co., Ltd., Hebei (CN)

( * ) Notice: Subject to any disclaimer, the term of this patent is extended or adjusted under 35 U.S.C. 154(b) by 961 days.

(21) Appl. No.: 13/140,798

(22) PCT Filed: Dec. 17, 2009

(86) PCT No.: PCT/CN2009/001488
§ 371 (c)(1),
(2), (4) Date: Aug. 30, 2011

(87) PCT Pub. No.: WO2010/069146
PCT Pub. Date: Jun. 24, 2010

(65) Prior Publication Data
US 2011/0302833 A1    Dec. 15, 2011

(30) Foreign Application Priority Data

Dec. 19, 2008  (CN) .......................... 2008 1 0187264
Dec. 19, 2008  (CN) .......................... 2008 1 0187265

(51) Int. Cl.
*C10G 1/00*   (2006.01)
*C10L 3/08*   (2006.01)
*C10J 3/72*   (2006.01)
(Continued)

(52) U.S. Cl.
CPC .. *C10L 3/08* (2013.01); *C10J 3/721* (2013.01); *C10J 3/78* (2013.01); *C10L 9/086* (2013.01); *C10J 2300/093* (2013.01);
(Continued)

(58) Field of Classification Search
CPC ............. C10G 1/00; C10G 1/04; C10G 1/008
USPC ........................... 208/400, 426, 428, 429, 49
See application file for complete search history.

(56) References Cited

U.S. PATENT DOCUMENTS 4,113,446 A     9/1978  Modell et al.
4,474,011 A  *  10/1984  Nelson et al. .................. 60/648

FOREIGN PATENT DOCUMENTS

CN    1 654 313    8/2005
CN    1 219 852    9/2005
(Continued)

OTHER PUBLICATIONS

Jicheng et al, Method for Continuous conversion of low-rank coal in subcritical water or supercritical water, Published Nov. 10, 2004, English translation of CN 1544580, accessed from Pro Quest on Jun. 13, 2014.*
International Search Report, issued in corresponding International Application No. PCT/CN2009/001488.
International Preliminary Report on Patentability, issued in corresponding International Application No. PCT/CN2009/001488.

*Primary Examiner* — Michelle Stein
(74) *Attorney, Agent, or Firm* — Wood, Phillips, Katz, Clark & Mortimer (57) ABSTRACT

A coal processing method includes adding coal powder, water and catalyst into a series of tandem reactors and processing therein, wherein the coal powder, water and catalyst are added into the first reactor of the series of tandem reactors; and the temperature and pressure of the series reactors is alternatively arranged in sub-critical state and supercritical state of water from the first reactor, the total product from the previous reactor is used as the feed of the next reactor without any further separation.

11 Claims, 4 Drawing Sheets (51) Int. Cl.
*C10J 3/78* (2006.01)
*C10L 9/08* (2006.01)
*C10L 1/32* (2006.01)

(52) U.S. Cl.
CPC ......... *C10J 2300/0986* (2013.01); *C10L 1/326* (2013.01); *C10J 2300/0979* (2013.01)

(56) References Cited

FOREIGN PATENT DOCUMENTS

| | | |
|---|---|---|
| CN | 101 497 820 | 8/2009 |
| CN | 101 497 821 | 8/2009 |
| JP | 2001-192676 | 7/2001 |

* cited by examiner

COAL PROCESSING METHOD BY USING CHARACTERISTICS OF SUB-CRITICAL AND SUPERCRITICAL WATER

TECHNICAL FIELD

The invention relates to a coal processing method, especially relates to a processing method for continuously and effectively converting coal into combustible gas, liquid and solid product by using the sub-critical water and supercritical water.

BACKGROUND OF THE INVENTION

Coal is a major energy source in China, and its reserve is about one trillion tons, counting for more than 95% of the total fossil fuels in China. On one hand, more than 84% of the coal in China is directly burned, resulting in the low heat efficiency and much pollution. On the other hand, there is an increasing demand for the natural gas in China. It is estimated that the demand for natural gas will be 200 billions cubic meters in the year 2020, but the natural gas production at that time will only be 140-160 billions. Moreover, the natural gas made from coal can be transported in the pipes on large scale, resulting in the energy cost reduction, environmental protection, safety and low transportation cost. Thus, making proper use of coal resource and developing advanced technology for converting coal into natural gas cleanly and effectively are of great importance.

Converting coal into combustible gas such as $H_2$, $CH_4$, etc. by use of supercritical water is an emerging technology. In this field, there have been many researches in the world, but till now none of them reached the pilot plant stage. The General Atomic Company in USA uses supercritical water to oxidize the aqueous coal slurry (40 wt %) to produce $H_2$, but the results indicated that high concentration of aqueous coal slurry will result in the blockage and coking in the experiments. CCUJ Company in Japan uses supercritical water to oxidize the mixture of coal and catalyst such as CaO to produce $H_2$, but this technology is not suitable for industrial production because the amount of catalyst used is too large. Xi'an Jiaotong University studied the co-gasification of coal and biomass. In patent CN1654313A, Guo Iiejin, et al., used the coal and biomass model and co-gasified many kind of biomass in the supercritical water, but the concentration of aqueous coal slurry is low (<2 wt %), so the energy cost in the conversion process is increased. Shan'xi Coal Chemistry Institute has done much work on the production of $H_2$ from low-grade coal by the supercritical water oxidation (SCWO) method. In patent CN1544580A, Bi Jicheng et al., disclosed the conversion method of low-grade coal in supercritical water, but from the results of related experiments, the conversion of coal is lower than 50%, this is not suitable for industrial production. Furthermore, there is no report on producing methane from the coal in the supercritical water. To sum up, there are still some technical problems to industrially carry out the coal conversion in the supercritical water. The main problems are that the particle size of catalyst is large and the specific surface area of catalyst is small, and the catalyst particles can not uniformly disperse on the coal particles, which limit the contact of catalyst with coal, leading to the low catalyst activity. In traditional method, one generally increases the adding amount of catalyst to improve catalysis performance because of the low catalyst activity. The adding amount of catalyst is generally from 20 wt % to 40 wt %. This adding amount is so big that the flux of reactants has to be decreased, and the effective recovering and recycling of catalyst is a problem which is difficult to solve, and the producing cost is increased.

SUMMARY OF THE INVENTION

The object of this invention is to provide a coal processing method by using the characteristics of sub-critical water and supercritical water, including feeding coal powder, water and catalyst into a series of tandem reactors and processing therein, wherein the coal powder, water and catalyst are fed into the first reactor of the series of tandem reactors; and wherein beginning from the first reactor, the temperature and pressure of the series of tandem reactors are alternatively arranged in sub-critical water state and supercritical water state; and the total products from the previous reactor are fed into the next reactor without any separation.

In another aspect, the invention provide a coal processing method, including feeding coal powder, water and catalyst into a series of tandem reactors and processing therein, wherein the coal powder and water are fed into the first reactor of the series of tandem reactors, and the catalyst, which in the form of aqueous solution, is fed into the connecting pipe between the first reactor and the second reactor or into the second reactor, and wherein beginning from the first reactor, the temperature and pressure of the series of tandem reactors are alternatively arranged in sub-critical water state and supercritical water state; and the total products from the previous reactor are fed into the next reactor without any separation.

DETAILED DESCRIPTION OF THE INVENTION

The coal used in the invention may be selected from bituminous coal, anthracite, lignite, biomass, organic waste and mixture thereof. The coal can be powdered by any method, the resulting coal powder can has the particle size of less than 300 microns, preferably less than 150 microns. The coal powder and the water can be separately fed into the first reactor of the series of tandem reactors, or they can firstly be mixed into aqueous coal slurry by any known method in the art and then the aqueous coal slurry is fed into the first reactor. The aqueous coal slurry is preferred. Based on the total weight of the aqueous coal slurry, the coal powder content, i.e., the concentration of the aqueous coal slurry, can be in the range from 8 wt % to 70 wt %, preferably from 30 wt % to 65 wt %. Preferably, in the invention, the coal powder is optionally pre-treated by other treating steps such as pre-treated in sub-critical water or supercritical water prior to being fed into the first reactor.

The aqueous coal slurry as formulated above can be fed into the first reactor by a fluid transportation device such as a pump. At the same time, the catalyst is added into the first reactor. The catalyst is selected from the group consist of the followings: alkali metal oxide or alkaline earth metal oxide, alkali metal hydroxide or alkaline earth metal hydroxide and alkali metal salt or alkaline earth metal salt, and the mixture thereof. For example, the catalyst is selected from the group consist of $K_2O$, $Na_2O$, CaO, MgO, KOH, $Ca(OH)_2$, $Mg(OH)_2$, $K_2CO_3$ and $Na_2CO_3$, and the mixture thereof. The catalyst can be added in the form of powder, but preferably, it is added in the form of aqueous solution. The aqueous coal slurry and the catalyst aqueous solution can separately fed into the first reactor, or they can firstly be mixed together and then be fed into the first reactor together. Or, as an alternative embodiment, the catalyst solution (preferably catalyst aqueous solution) is added into the connecting pipe between the first reactor and the second reactor or into the second reactor in the supercritical water state, and wherein the catalyst solution is not in the supercritical water state prior to being fed into the second reactor. Without being bound by any theory, it is believed that such catalyst solution will undergo a transformation from non-supercritical water state to supercritical water state, such as a transformation from sub-critical water state to supercritical water state, after being fed into the second reactor in supercritical water state. Optionally, some water is fed into the first reactor to adjust the overall weight ratio of coal to water to e.g. 5-50:1. The sub-critical water state in the first reactor can also be adjusted by controlling the temperature and pressure of said some water. The temperature and pressure in the first reactor is in the sub-critical water state. Herein, the sub-critical water state is defined as the following state: a temperature above 100° C. and below 374° C. which is the critical temperature of water, and a pressure under which the water remains in liquid state. For example, the sub-critical water state used in the invention can be the following state: a temperature from 120° C. to 374° C., and a pressure from 16 MPa to 40 MPa. In the first reactor, under the sub-critical water state, complicated physical and chemical reactions occurs between the coal and the water, resulting solid product, combustible gas and tar. Wherein the tar contains lignite wax, anthracene, phenanthrene and the like, and the combustible gas contains $H_2$, $CH_4$ and the like, and the solid product is the treated coal powder, which is also called semi-coke in the art. The treated coal powder's specific surface area and porosity are greatly increased, so its reactivity is greatly enhanced, and the catalyst is easier to disperse on the surface and in the pores of this treated coal powder.

Optionally, the aqueous coal slurry and the water are preheated in a pre-heater and pressurized by a pump prior to being fed into the first reactor.

Then all the materials in the first reactor is sent into the second reactor, the second reactor is connected with the first reactor in series and the temperature and pressure in the second reactor is in the supercritical water state. Herein, the supercritical water state is defined as the following state: a temperature above 374° C. which is the critical temperature of water, and a pressure above 22.1 MPa which is the critical pressure of water. For example, in the invention, the supercritical water state can be following state: a temperature from 374° C. to 650° C., and a pressure from 22.1 MPa to 40 MPa. During the transformation from the sub-critical water state in the first reactor to the supercritical water state in the second reactor, the catalyst, which originally dissolved in water, will be separated from water due to the dramatic drop of its solubility and disperse on the surface and in the inner pores of the semi-coke. Due to the high permeability of supercritical water and the high porosity of the semi-coke, the catalyst can disperse more uniformly and contact with the coal more sufficiently than traditional impregnation dispersion method. Under the action of catalyst, the coal powder reacts with supercritical water, forming some liquid products and a gas product comprising methane and hydrogen.

Then the effluent from the second reactor can be subject to further separation steps in order to separate the gas product, the liquid product and the solid product from each other. These separation steps are ordinary skills in the art, so they are not further discussed herein. Some separated materials, such as water, tar and un-reacted coal residues, can be recycled to a certain reactor for reuse. This kind of reuse is optional, and is the ordinary skills in the art, so it is not further discussed herein.

In an alternative embodiment, all the effluent from the second reactor can be fed into the third reactor, the third reactor is connected with the second reactor in series and the temperature and pressure in the third reactor is in the sub-critical water state, and the sub-critical water state in the third reactor can be the same with or different from that in the first reactor. Without being bound by any theory, it is believed that the catalyst re-dissolved into the water during the transformation from the supercritical water state in the second reactor to the sub-critical water state in the third reactor. Then all the effluent from the third reactor can be fed into the fourth reactor, the fourth reactor is connected with the third reactor in series and the temperature and pressure in the fourth reactor is in the supercritical water state, and the supercritical water state in the fourth reactor can be the same with or different from that in the second reactor. The catalyst, which has re-dissolved into the water in the third reactor, will again be separated from the water due to the dramatic drop of its solubility and re-disperse on the surface and in the inner pores of the semi-coke. Without being bound by any theory, it is believed that such re-dissolving and re-dispersing process will let the catalyst particles move from one site of coal powder to another site of coal powder and play its catalysis function once again. In such manner, the catalyst particles deposited on the inactive site of the coal powder surface have the chance to re-deposit on other active site of the coal powder surface and facilitate its catalysis action.

Obviously, there can be the fifth reactor and the sixth reactor in series, wherein the temperature and pressure in the fifth reactor is in the sub-critical water state, and the sub-critical water state in the fifth reactor can be the same with or different from that in the first and/or the third reactor(s). The temperature and pressure in the sixth reactor is in the supercritical water state, and the supercritical water state in the sixth reactor can be the same with or different from that in the second and/or fourth reactor(s), the rest may be deduced by analogy. Therefore, an important feature of the invention is that passing coal powder, water and catalyst in turn through a series of tandem reactors, wherein beginning from the first reactor, the temperature and pressure of the series of tandem reactors are alternatively arranged in sub-critical water state and supercritical water state; and the total products from the previous reactor are used as the feed of the next reactor without any separation. In the preferable embodiment of the invention, the series of tandem reactors include 2-10 reactors, preferably 4-6 reactors.

Then the effluent from the last reactor can be subjected to subsequent separation step and some separated materials can be optionally recycled to a certain reactor for reuse. These separation steps and recycle steps are ordinary skills in the art, so they are not further discussed herein.

The reactor used in the invention may be a commonly used reactor, such as fluidized bed reactor, moving bed reactor, continuous tubular reactor, etc., and each reactor may be the same or different, preferably same. The material of which each reactor is made can be selected independently, preferably nickel-based alloy which is resistant to the high temperature and high pressure.

Optionally, an oxidant such as oxygen gas or hydrogen peroxide is fed into any one or several reactor(s) so as to form an internal-heating reactor by the exothermic reaction between coal and the oxidant. The temperature in each reactor can be adjusted by controlling the flow rate of the oxidant.

The residence time of reactant in each reactor can be selected independently, and can be the same or different.

The foregoing is the first embodiment of the invention. The invention can be carried out in other manner. For example, the series of tandem reactors may not be separate physically, instead, they can be integrated into one integrated reactor. This integrated reactor includes a series of tandem reaction region, wherein beginning from the first reaction region, the temperature and pressure of the set of series reaction regions are alternatively arranged in sub-critical water state and supercritical water state, for example, reaction region A1 is in the sub-critical water state, and reaction region A2 is in the supercritical water state, and reaction region A3 is in the sub-critical water state, and reaction region A4 is in the super-critical water state, the rest may be deduced by analogy. The reactants pass in turn through each reaction region and react, finally they exit from the integrated reactor and enter the subsequent separation steps. In this kind of embodiment, the concentration of aqueous coal slurry, the particle size of the coal powder, the weight ratio of coal to water, the selection of catalyst, and the selection of coal, the selection of special parameters in the sub-critical water state and supercritical water state, and so on, are the same with what is described in above first embodiment.

Figure 1:
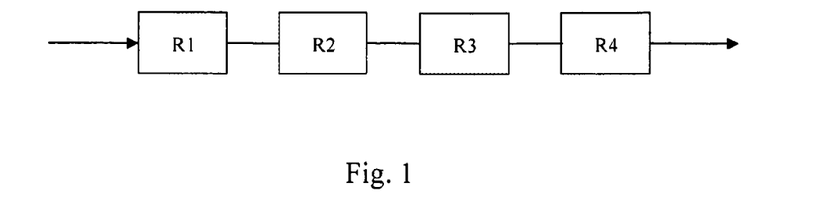
FIG. 1 is the schematic drawing of the first embodiment of the invention, wherein reactor R1 is in the sub-critical water state, and reactor R2 is in the supercritical water state, and reactor R3 is in the sub-critical water state, and reactor R4 is in the supercritical water state, the rest may be deduced by analogy.
Figure 2:
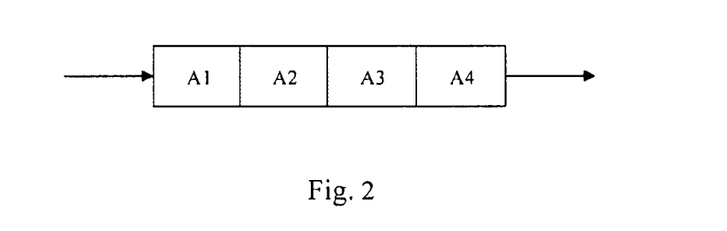
FIG. 2 is the schematic drawing of the second embodiment of the invention, wherein in an integrated reactor, reaction region A1 is in the sub-critical water state, and reaction region A2 is in the supercritical water state, and reaction region A3 is in the sub-critical water state, and reaction region A4 is in the supercritical water state, the rest may be deduced by analogy.
Figure 3:
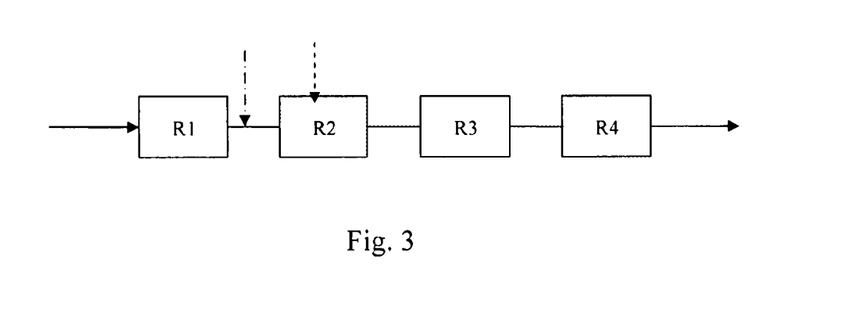
FIG. 3 is the schematic drawing of the third embodiment of the invention, wherein the aqueous coal slurry is fed into the first reactor in the sub-critical water state, and the catalyst solution is fed into the connecting pipe between the first reactor and the second reactor (as shown by the dot-and-dash line) or into the second reactor in the supercritical water state (as shown by the dashed line).
Figure 4A:
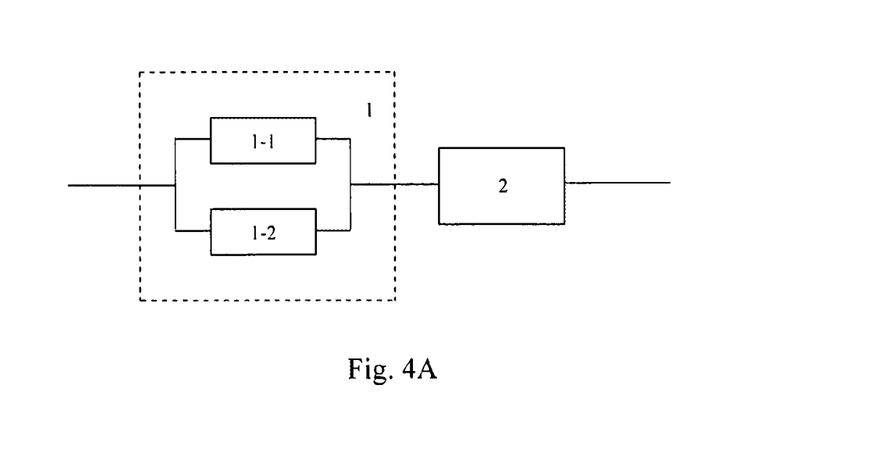
FIGS. 4A and 4B are the schematic drawing of two kinds of variation of "tandem" mode.
Figure 4B:
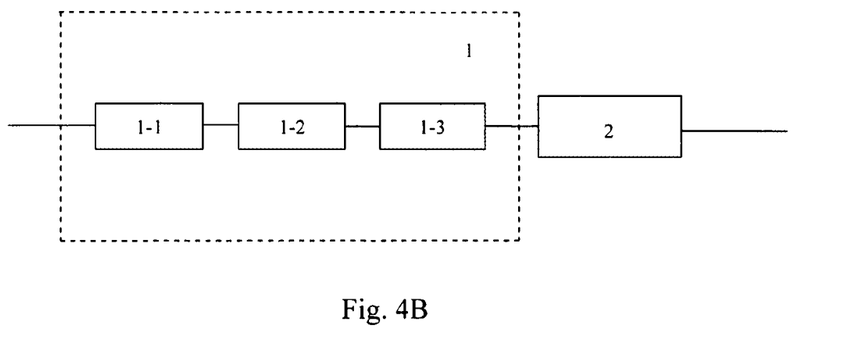

The term "tandem" or "in series" should be broadly understood, which includes both the strict tandem situation as shown in FIG. 1, and includes the situation that the connecting relationship is tandem from the whole layout viewpoint, although there may be local connecting relationship in series, in parallel or in other manner. For example, one reactor can be substituted by two sub-reactors in parallel, as shown in FIG. 4A, the first reactor 1 consists in two sub-reactors 1-1 and 1-2 in parallel, in this case, these sub-reactors in parallel can be as a whole in series with other reactor such as reactor 2. Alternatively, one reactor can be substituted by several sub-reactors in series, as shown in FIG. 4B, the first reactor 1 consists in three sub-reactors 1-1, 1-2 and 1-3 in series, in this case, these sub-reactors in series can be as a whole in series with other reactor such as reactor 2.

The foregoing has introduced the embodiments of the invention. Each variant embodiment is easy to envisage by the skilled in the art after reading the taught of the invention. For example, there can be additional reactor(s) before and/or after the set of series reactor in the invention. In other words, among all the reactors, only some reactors constitute the series of tandem reactors whose temperature and pressure are alternatively arranged in sub-critical water state and supercritical water state. This situation is also deemed as the variant embodiment of the invention.

Obviously, the method of the invention can not only apply to the coal, but also apply to all kind of carbonaceous materials such as petroleum coke, biomass, and so on.

EXAMPLES

The invention will be illustrated by following non-limiting examples.

Example 1

Figure 5:
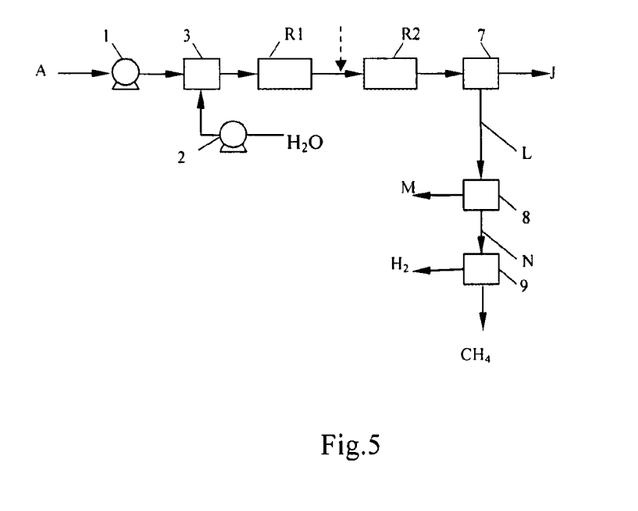
FIG. 5 is the flow chart of one specific embodiment of the invention.
Figure 6A:
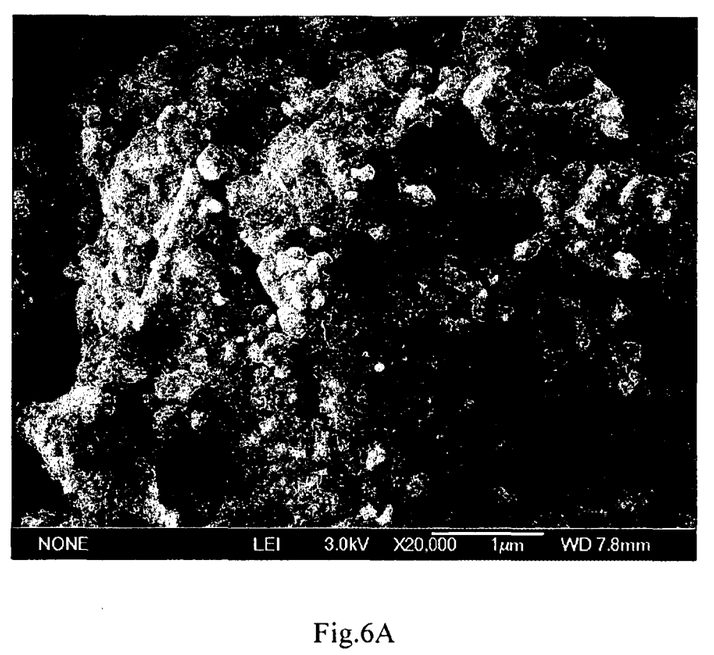
FIG. 6 is the SEM images of some samples.
Figure 6B:
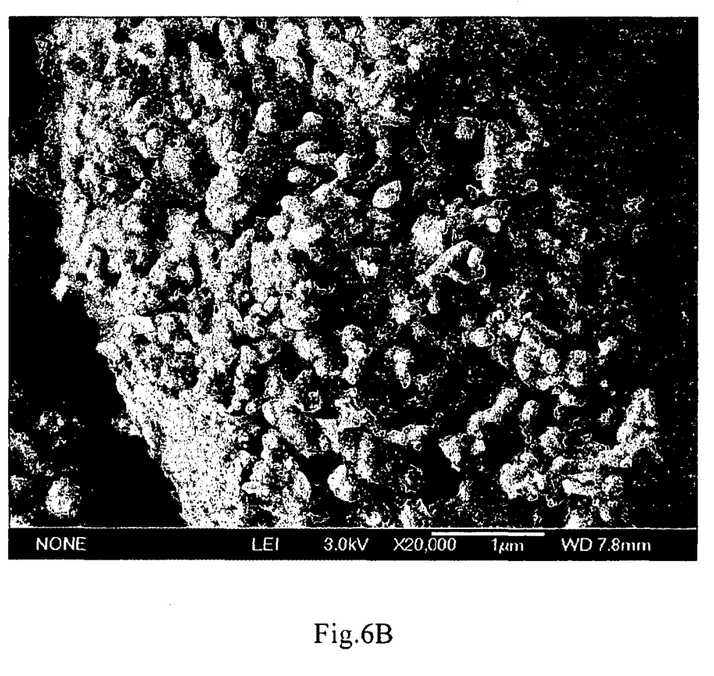
Figure 6C:
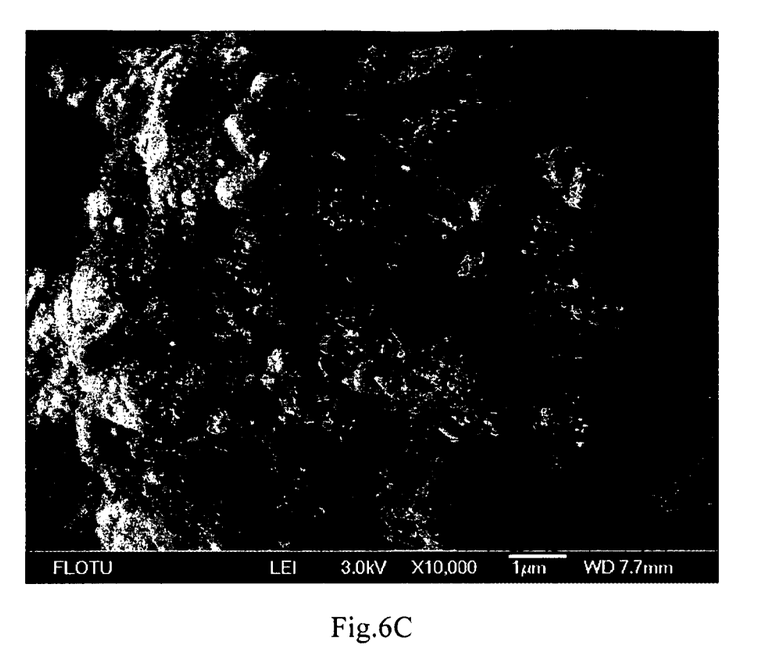
Figure 6D:
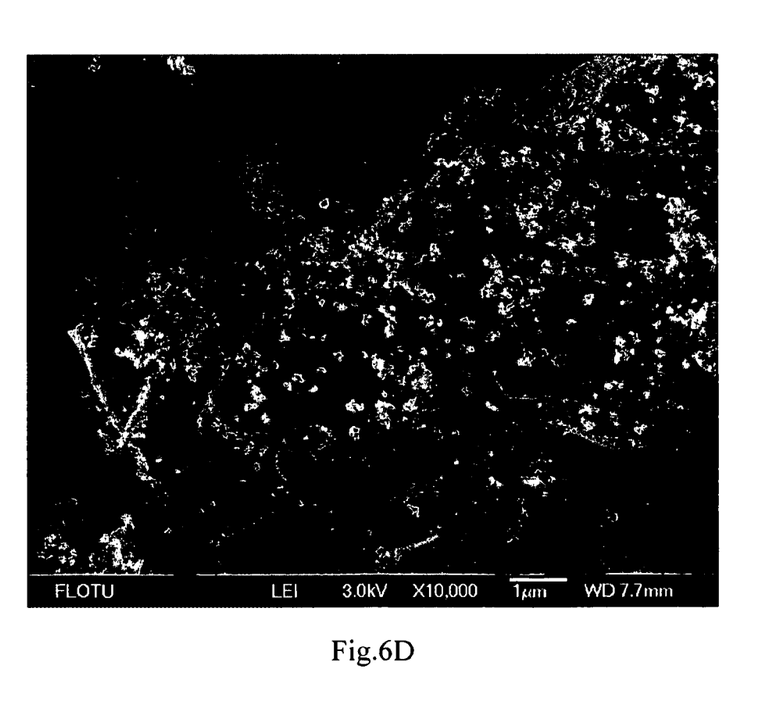

The schematic flow chart of this example is shown in FIG. 5. The aqueous coal slurry A with a concentration of 30 wt % is fed into the aqueous coal slurry pre-heater 3 at a flow rate of 5 l/h by a high pressure aqueous coal slurry pump 1. At the same time, a water which has been preheated to 420-450° C. is fed into the aqueous coal slurry pre-heater 3 at a flow rate of 5 l/h by a high pressure water pump 2. The preheated aqueous coal slurry and the preheated water mixed together and then enter the first reactor R1. The operation conditions in R1 is a temperature of 360° C. and a pressure of 23-25 MPa. The effluent from R1 totally enters R2 without any separation. A $K_2CO_3$ catalyst solution with a concentration of 30% is fed at a flow rate of 0.5 l/h into the effluent from R1 in a position between R1 and R2, then both of them enter the gasifier R2. The operation conditions in R2 is a temperature of 600° C. and a pressure of 23-25 MPa. The effluent from R2 enters gas/liquid/solid separator 7 to be separated into solid coal residue J and gas-liquid product L. Then the gas-liquid product L is separated into liquid product M and gas product N by a gas/liquid separator 8. The liquid product M comprises water and liquid $CO_2$, and the gas product N comprises $CH_4$ and $H_2$. Then the gas product N is subjected to a pressure swing adsorption process 9, so that $CH_4$ and $H_2$ are separated out and collected, respectively. The reaction conditions in each reactor and the conversion, the gas yield of the whole catalytically gasification reaction and the gas composition data are listed in Table 1.

Example 2

The procedure and experiment conditions in example 2 is similar with example 1, except that the catalyst is directly dissolved in the aqueous coal slurry A and enters the first reactor R1 together with the aqueous coal slurry, rather than adding catalyst solution in the position between R1 and R2. The reaction conditions in each reactor and the conversion, the gas yield of the whole catalytically gasification reaction and the gas composition data are also listed in Table 1.

Example 3

The aqueous coal slurry A with a concentration of 30 wt % is fed into the aqueous coal slurry pre-heater 3 at a flow rate of 5 l/h by a high pressure aqueous coal slurry pump 1. In the pre-heater 3, the aqueous coal slurry is preheated to 300° C. At the same time, a water which has been preheated to 650° C. is fed into the aqueous coal slurry pre-heater 3 at a flow rate of 5 l/h by a high pressure water pump 2. The preheated aqueous coal slurry and the preheated water mixed together and then enter the first reactor R1. The operation conditions in R1 is a temperature of 600° C. and a pressure of 23-25 MPa. At the same time, a $K_2CO_3$ catalyst solution with a concentration of 30% is fed at a flow rate of 0.5 l/h into R1, and the effluent from R1 totally enters the second reactor R2 without any separation. The operation conditions in R2 is also maintained at a temperature of 600° C. and a pressure of 23-25 MPa. The subsequent separation steps in example 2 are the same with that in example 1. The reaction conditions in each reactor and the conversion, the gas yield of the whole catalytically gasification reaction and the gas composition data are also listed in Table 1.

Example 4

The procedure and experiment conditions in example 4 is similar with example 2, except that the type and amount of catalyst used are different and the operation conditions in the first reactor R1 is different, details are as follows: the aqueous coal slurry A with a concentration of 30 wt % is fed into the aqueous coal slurry pre-heater 3 at a flow rate of 5 L/h by a high pressure aqueous coal slurry pump 1, wherein the aqueous coal slurry contains $Na_2CO_3$ as catalyst, the weight of $Na_2CO_3$ accounts for 15% of the coal weight in the aqueous coal slurry. The aqueous coal slurry is preheated to 250° C. in the aqueous coal slurry pre-heater 3. At the same time, a water which has been preheated to 450-500° C. is fed into the aqueous coal slurry pre-heater 3 at a flow rate of 5 l/h by a high pressure water pump 2. The preheated aqueous coal slurry and the preheated water mixed together and then enter the first reactor R1. The operation conditions in R1 is a temperature of 370° C. and a pressure of 23-25 MPa. The effluent from R1 totally enters the second reactor R2 without any separation. The operation conditions in R2 is a temperature of 650° C. and a pressure of 23-25 MPa. The subsequent separation steps in example 4 are the same with that in example 1. The reaction conditions in each reactor and the conversion, the gas yield of the whole catalytically gasification reaction and the gas composition data are also listed in Table 1.

Example 5

The procedure and experiment conditions in example 5 is similar with example 2, except that the concentration of the aqueous coal slurry, the amount of catalyst used and the operation conditions of each reactor are different, details are as follows: the aqueous coal slurry A with a concentration of 60 wt % is fed into the aqueous coal slurry pre-heater 3 at a flow rate of 5 l/h by a high pressure aqueous coal slurry pump 1, wherein the aqueous coal slurry contains $K_2CO_3$ as catalyst, the weight of $K_2CO_3$ accounts for 5% of the coal weight in the aqueous coal slurry. The aqueous coal slurry is preheated to 250° C. in the aqueous coal slurry pre-heater 3. At the same time, a water which has been preheated to 400-450° C. is fed into the aqueous coal slurry pre-heater 3 at a flow rate of 5 l/h by a high pressure water pump 2. The preheated aqueous coal slurry and the preheated water mix together and then enter the first reactor R1. The operation conditions in R1 is a temperature of 350° C. and a pressure of 22.1-23 MPa. The effluent from R1 totally enters the second reactor R2 without any separation. The operation conditions in R2 is a temperature of 630° C. and a pressure of 22.1-23 MPa. The subsequent separation steps in example 5 are the same with that in example 1. The reaction conditions in each reactor and the conversion, the gas yield of the whole catalytically gasification reaction and the gas composition data are also listed in Table 1.

TABLE 1

| | Temperature In R1/ | Temperature in R2/ | Pressure in R1 and R2/ MPa | Catalyst type | Catalyst amount[a]/ % | Conversion[b]/ % | Production of gas product, $Nm^3$/kg coal | | | | |
|---|---|---|---|---|---|---|---|---|---|---|---|
| | | | | | | | $CH_4$ | $H_2$ | CO | $CO_2$ | others |
| example1 | 360 | 600 | 23-25 | $K_2CO_3$ | 10 | 80 | 0.42 | 0.66 | 0.02 | 0.50 | 0.005 |
| example2 | 360 | 600 | 23-25 | $K_2CO_3$ | 10 | 82 | 0.45 | 0.67 | 0.01 | 0.52 | 0.01 |
| example3 | 600 | 600 | 23-25 | $K_2CO_3$ | 10 | 75 | 0.37 | 0.59 | 0.02 | 0.49 | 0.004 |
| example4 | 370 | 650 | 23-25 | $Na_2CO_3$ | 15 | 85 | 0.49 | 0.60 | 0.01 | 0.48 | 0.007 |
| example5 | 350 | 630 | 22.1-23 | $K_2CO_3$ | 5 | 80 | 0.42 | 0.63 | 0.01 | 0.46 | 0.02 |

[a]Catalyst amount refers to the mass percent of catalyst based on the coal.
[b]Conversion refers to the mass percent of reacted coal based on original coal.

As can be seen from example 1-3, under the same catalyst amount, examples 1 and 2 wherein the first reactor is in sub-critical water state and the second reactor is in supercritical water state, produce more $CH_4$ and $H_2$, as compared with example 3 wherein the first reactor and the second reactor are both in supercritical water state. Example 4 and example 5 change the catalyst type and/or catalyst amount, and still produce more $CH_4$ and $H_2$ as compared with example 3. Furthermore, the invention produces more $CH_4$ than traditional catalytically gasification method.

FIG. 6 shows the SEM images of the solid samples taken out after mixing the catalyst with coal powder (or semi-coke) for about 1 minute in examples 1, 2 and 3, c.f. FIG. 6A, FIG. 6B and FIG. 6C respectively. As can be seen from FIG. 6A and FIG. 6B, the coal powder forms porous pores structure after being treated by the sub-critical water in reactor R1, and the separated catalyst particles disperse uniformly on the surface and in the pores of treated coal powder. The coal in FIG. 6C has not subjected to the sub-critical/supercritical water treating, so the catalyst particle only disperse on the surface of coal powder, resulting poor dispersion degree than that in FIG. 6A and FIG. 6B. FIG. 6D shows the SEM image of a sample produced by impregnating catalyst solution into the coal powder according to traditional impregnation method, wherein the mass of catalyst accounts for 10% based on the mass of coal. Because coal powder without being any treatment is dense in nature and there is no pores on which the catalyst can disperse, it is evident that the catalyst can only disperse on the surface of coal powder and there is obvious catalyst particles agglomeration phenomenon. These results show that the catalyst can be dispersed better by using the method of the invention.

Moreover, another beneficial effect of the invention can be seen from above examples: the catalyst amount used in the invention wherein the reactor(s) in sub-critical water state and the reactor(s) in supercritical water state are alternatively arranged is less than the catalyst amount used in a traditional method wherein the coal is catalytically gasified by supercritical water. For example, in the patents recited in the background portion, the catalyst amount accounts for 20-40 wt % based on the coal, whereas in the invention, the catalyst amount accounts for 5-15 wt % based on the coal and still can achieve a high coal conversion. So, the technical problem for recovering and recycling the catalyst is alleviated and the cost is greatly decreased.

The invention claimed is:

1. A coal processing method, including feeding coal powder, water and catalyst into a series of tandem reactors and processing therein, wherein the coal powder, water and catalyst are fed into the first reactor of the series of tandem reactors; and the temperature and pressure of each reactor of the series of tandem reactors is in a sub-critical water state or a supercritical water state and each reactor of the series of tandem reactors is in a water state that is different from the water state of the next reactor of the series of tandem reactors; and the total products from the previous reactor are fed into the next reactor without any separation, wherein the catalyst is selected from the group consisting of $K_2O$, $Na_2O$, CaO, MgO, KOH, $Ca(OH)_2$, $Mg(OH)_2$, $K_2CO_3$ and $Na_2CO_3$ and the catalyst amount accounts for 5-15 wt % based on the coal.

2. A coal processing method, including feeding coal powder, water and catalyst into a series of tandem reactors and processing therein, wherein the coal powder and water are fed into the first reactor of the series of tandem reactors, and the catalyst, which in the form of aqueous solution, is fed into the connecting pipe between the first reactor and the second reactor or into the second reactor, and wherein the temperature and pressure of each reactor of the series of tandem reactors is in sub-critical water state or supercritical water state and each reactor of the series of tandem reactors is in a water state that is different from the water state of the next reactor of the series of tandem reactors; and the total products from the previous reactor are fed into the next reactor without any separation, wherein the catalyst is selected from the group consisting of $K_2O$, $Na_2O$, CaO, MgO, KOH, $Ca(OH)_2$, $Mg(OH)_2$, $K_2CO_3$ and $Na_2CO_3$ and the catalyst amount accounts for 5-15 wt % based on the coal.

3. The method according to claim 1 or 2, wherein the series of tandem reactors includes 2-10 reactors.

4. The method according to claim 1 or 2, wherein the series of tandem reactors includes 4-6 reactors.

5. The method according to claim 1 or 2, wherein the sub-critical water state means the following state: a temperature above 100° C. and below 374° C. which is the critical temperature of water, and a pressure under which the water remains in liquid state.

6. The method according to claim 1 or 2, wherein the supercritical water state means the following state: a temperature above 374° C. which is the critical temperature of water, and a pressure above 22.1 MPa which is the critical pressure of water.

7. A coal processing method, including feeding fuel powder, water and catalyst into a series of tandem reactors and processing therein, wherein the fuel powder, water and catalyst are fed into the first reactor of the series of tandem reactors; and wherein the temperature and pressure of each reactor of the series of tandem reactors is in sub-critical water state or supercritical water state and each reactor of the series of tandem reactors is in a water state that is different from the water state of the next reactor of the series of tandem reactors; and the total products from the previous reactor are fed into the next reactor without any separation, wherein the catalyst is selected from the group consisting of $K_2O$, $Na_2O$, CaO, MgO, KOH, $Ca(OH)_2$, $Mg(OH)_2$, $K_2CO_3$ and $Na_2CO_3$ the catalyst amount accounts for 5-15 wt % based on the fuel and wherein the fuel is selected from bituminous coal, anthracite, lignite, biomass, organic waste and mixture thereof; or a coal processing method, including feeding fuel powder, water and catalyst into a series of tandem reactors and processing therein, wherein the fuel powder and water are fed into the first reactor of the series of tandem reactors, and the catalyst, which in the form of aqueous solution, is fed into the connecting pipe between the first reactor and the second reactor or into the second reactor, and wherein the temperature and pressure of each reactor of the series of tandem reactors are alternatively arranged in sub-critical water state and supercritical water state and each reactor of the series of tandem reactors is in a water state that is different from the water state of the next reactor of the series of tandem reactors; and the total products from the previous reactor are fed into the next reactor without any separation, wherein the catalyst is selected from the group consisting of $K_2O$, $Na_2O$, CaO, MgO, KOH, $Ca(OH)_2$, $Mg(OH)_2$, $K_2CO_3$ and $Na_2CO_3$, the catalyst amount accounts for 5-15 wt % based on the fuel and wherein the fuel is selected from bituminous coal, anthracite, lignite, biomass, organic waste and a mixture thereof.

8. The method according to claim 1 or 2, wherein the coal powder has a particle size less than 300 microns.

9. The method according to claim 1 or 2, wherein the coal powder is optionally pre-treated in sub-critical water or supercritical water prior to being fed into the first reactor.

10. The method according to claim 1 or 2, wherein the weight ratio of coal to water is 5-50:1.

11. The method according to claim 1 or 2, wherein an oxidant is fed into any one or several of the reactor(s) so as to form an internal-heating reactor by the exothermic reaction between coal and the oxidant.

* * * * *